United States Patent [19]

Bezos et al.

[11] Patent Number: 5,267,473

[45] Date of Patent: Dec. 7, 1993

[54] SELF POWERED END OF TRAIN UNIT

[75] Inventors: Angel P. Bezos, Rockville, Md.; Emilio A. Fernandez, McLean, Va.

[73] Assignee: Pulse Electronics, Inc., Rockville, Md.

[21] Appl. No.: 780,738

[22] Filed: Oct. 18, 1991

[51] Int. Cl.$^5$ .............................................. G01L 5/28
[52] U.S. Cl. .................................................. 73/129
[58] Field of Search ...................... 73/129; 105/35, 36; 213/1 R; 310/77; 322/4

[56] References Cited

U.S. PATENT DOCUMENTS

| | | |
|---|---|---|
| 4,344,138 | 8/1982 | Frasier . |
| 4,487,060 | 12/1984 | Pomeroy . |
| 4,553,723 | 11/1985 | Nichols et al. . |
| 4,582,280 | 4/1986 | Nichols et al. . |
| 4,641,892 | 2/1987 | Schmid . |
| 4,747,302 | 5/1988 | Goss ..................................... 73/129 |
| 4,876,885 | 10/1989 | Martin et al. ........................ 73/129 |
| 5,077,515 | 12/1991 | St. Arnauld .............................. 322/4 |
| 5,131,269 | 7/1992 | Blosnick et al. ...................... 73/129 |

Primary Examiner—Robert Raevis
Attorney, Agent, or Firm—Whitham & Marhoefer

[57] ABSTRACT

Power supply for an EOT unit in which an electrical generator driven by air from the train air brake pipe provides the primary power to the EOT unit. The power supply of this invention may be incorporated as part of the EOT unit or it may be supplied as a power kit modification for existing EOT units in order to replace electric storage batteries in these units.

3 Claims, 3 Drawing Sheets

2

SELF POWERED END OF TRAIN UNIT

BACKGROUND OF THE INVENTION

1. Field of the Invention

The present invention generally relates to railroad end-of-train (EOT) units, and more particularly to an improved system for supplying power for such EOT units.

2. Description of the Prior Art

End-of-train units coupled to the last car of a train are used extensively by railroads to monitor air pressure in the air brake pipe, which runs the length of the train, and other parameters such as motion, and transmit this information to a head-of-train (HOT) unit located usually in the locomotive. In addition, in some units the head-of-train (HOT) unit can transmit an emergency brake application command to the end-of-train unit. Typically, a radio transmission is used for communication between the HOT and the EOT. An EOT unit typically includes a transmitter, a microprocessor, and transducer input ports for brake pressure, motion and other inputs.

EOT units in operation today are powered by electric storage batteries; see for example U.S. Pat. No. 4,487,060. Nickel/cadmium (NICAD) and lead/acid batteries are both used; each has certain advantages and certain disadvantages. Batteries have to be recharged and/or changed sometimes in remote places. Thus, the railroad has to have batteries or battery chargers in locations throughout the railroad. Due to the severe environment (vibration and rough handling of equipment) the normal life of the rechargeable batteries used is significantly reduced.

SUMMARY OF THE INVENTION

An object of this invention is the provision of an EOT which does not use an electric storage battery as a source of power in normal operation.

Another object of this invention is the provision of an EOT system powered from the train air brake pipe with back-up battery power in the event of air power failure in operation; a system that distinguishes between an EOT out-of-operation condition and an in-operation condition, and limits the back-up battery use to an in-operation failure mode.

Briefly, this invention contemplates the provision of a power supply for an EOT unit in which an electrical generator driven by air from the train air brake pipe provides the primary power to the EOT unit. The power supply of this invention may be incorporated as part of the EOT unit or it may be supplied as a power kit modification for existing EOT units in order to replace electric storage batteries in these units. The air-driven generator requires only a small fraction of the railroad industry standards for allowable leakage from the air brake pipe; for example, the air requirements for the generator may be on the order of ⅛ CFM, while the allowable loss is on the order of 60 CFM. In one preferred embodiment of the invention, the system has a battery back-up which is disconnected from the system except in response to certain test conditions, and in the event of failure of the primary power or temporary loss of air during a normal operating mode of the EOT unit; e.g. a normal operating mode may be defined as the EOT unit in an upright position and operating under primary power for longer than a predetermined minimum period of time.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
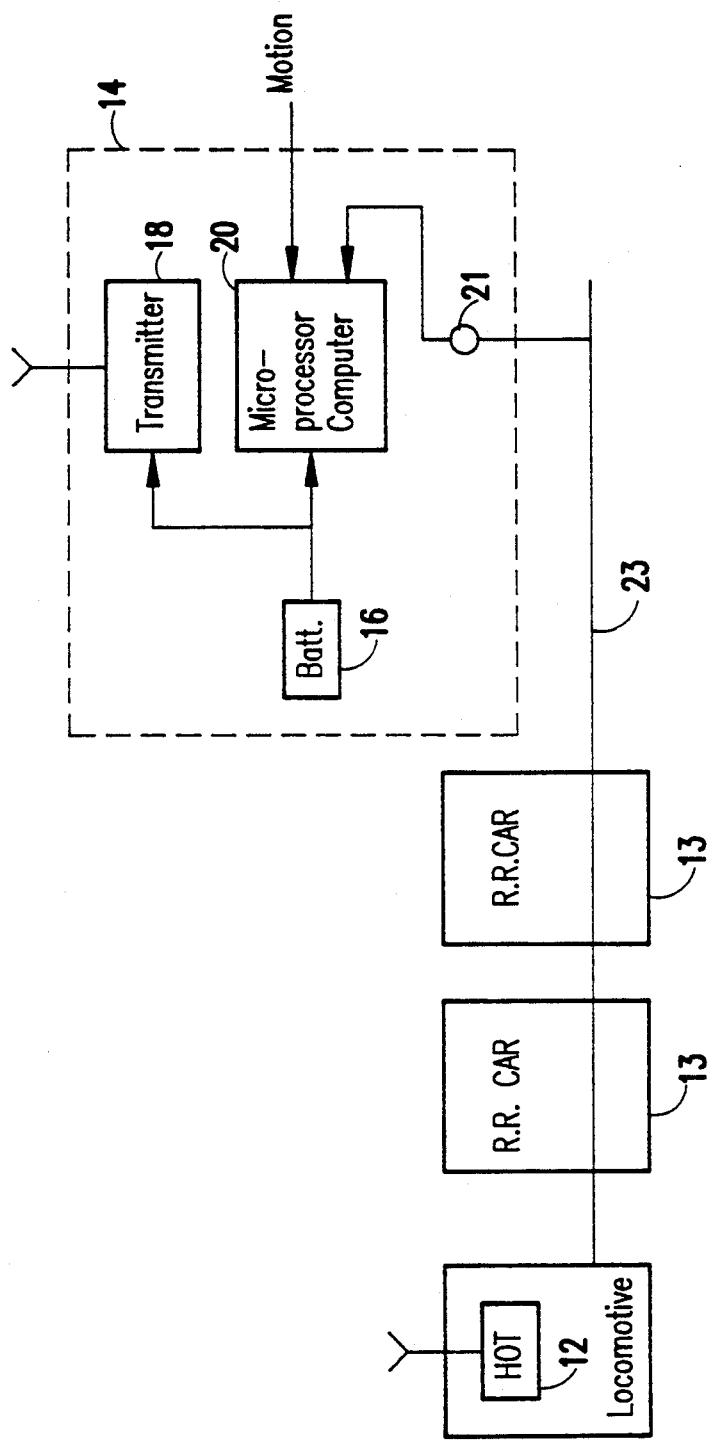
FIG. 1 is a block diagram illustrating a typical EOT system in common use today.

Referring now to FIG. 1, it illustrates a railroad train with an HOT unit 12 at the head of the train and an EOT unit 14 at the rear end thereof. An air brake pipe 23 formed by coupled pipe sections carried by intermediate cars 13 extends from the locomotive to the EOT 14. FIG. 1 is intended to illustrate a typical system in use today, including an electric storage battery 16 serving as the EOT electric power supply. As will be appreciated by those skilled in the art, the EOT unit includes a transmitter 18, a digital computer 20 (e.g., a microprocessor computer), all powered by the battery 16. A transducer 21 located in the EOT 14 monitors the pressure in the train air brake pipe 23, and the EOT transmits this information to the HOT unit where it is displayed for an operator. Other monitored conditions typically include EOT motion. HOT/EOT systems, to which the teachings of this invention are applicable, are well known in the art. Rear to front communications and other physical guidelines, like recommended battery life, are specified on the Association of American Railroads Standard No. 12-15 originally issued in the early 1980's.

Figure 2:
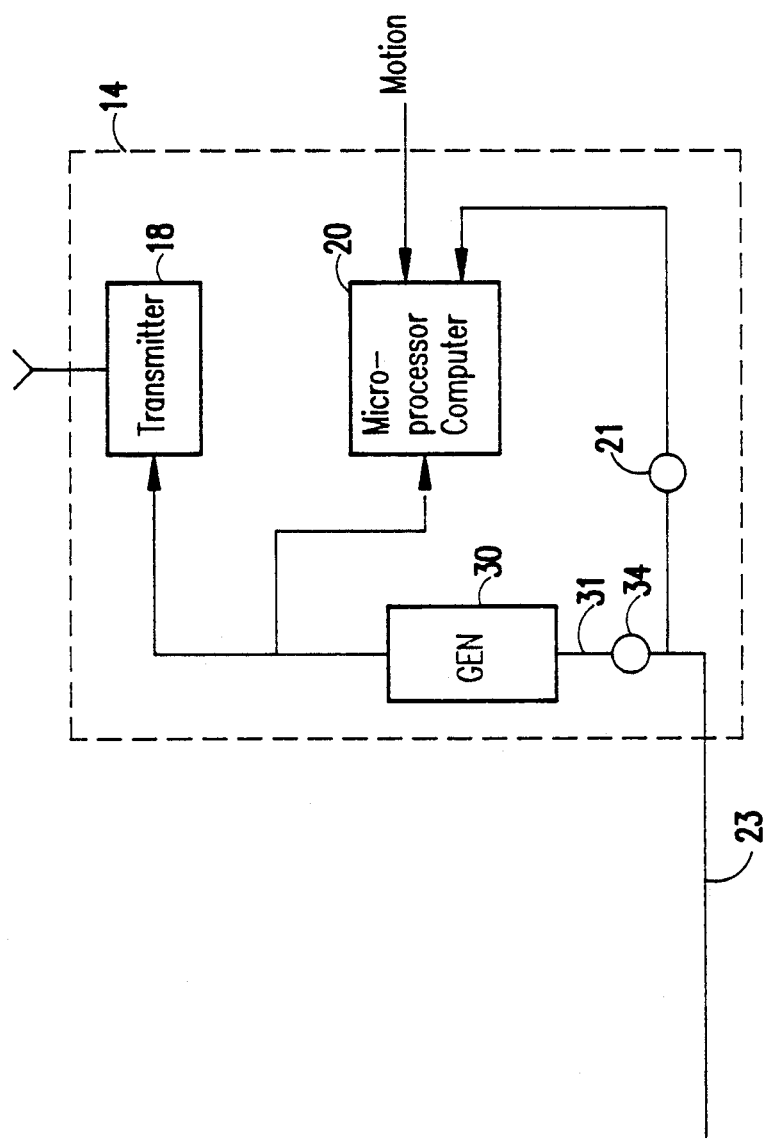
FIG. 2 is a block diagram illustrating an EOT with a power system in accordance with the teachings of this invention.

Referring now to FIG. 2, in accordance with the teachings of this invention, an air-driven generator 30 serves to supply electric power to all the components of the EOT unit. A hose 31 couples generator 30 to the air brake pipe 23. The brake pipe 23 connects to the hose 31 via a fitting known in the railroad art as a glad hand fitting and the brake pipe 23 typically terminates at this glad hand fitting. The generator uses a very small amount of air from the air brake pipe. The generator 30 may be any suitable air-driven generator known in the art, such as an air motor/alternator and rectifier combination or an air turbine/alternator and rectifier combination. Small, light-weight generators are known in the art that can generate sufficient power for the EOT application, yet require only a small fraction of the railroad industry specification for allowable air brake pipe leakage. If desired, a small diameter (e.g., 1/16 or 1/32 inch) air choke 34 may be used in series between the generator 30 and the brake pipe 23 in order to isolate the air brake pipe from the generator. The choke 34 assures that the amount of air bled from the air brake pipe will be minimal and will not affect the operation of the train brake system even if there is a leak through the generator.

Figure 3:
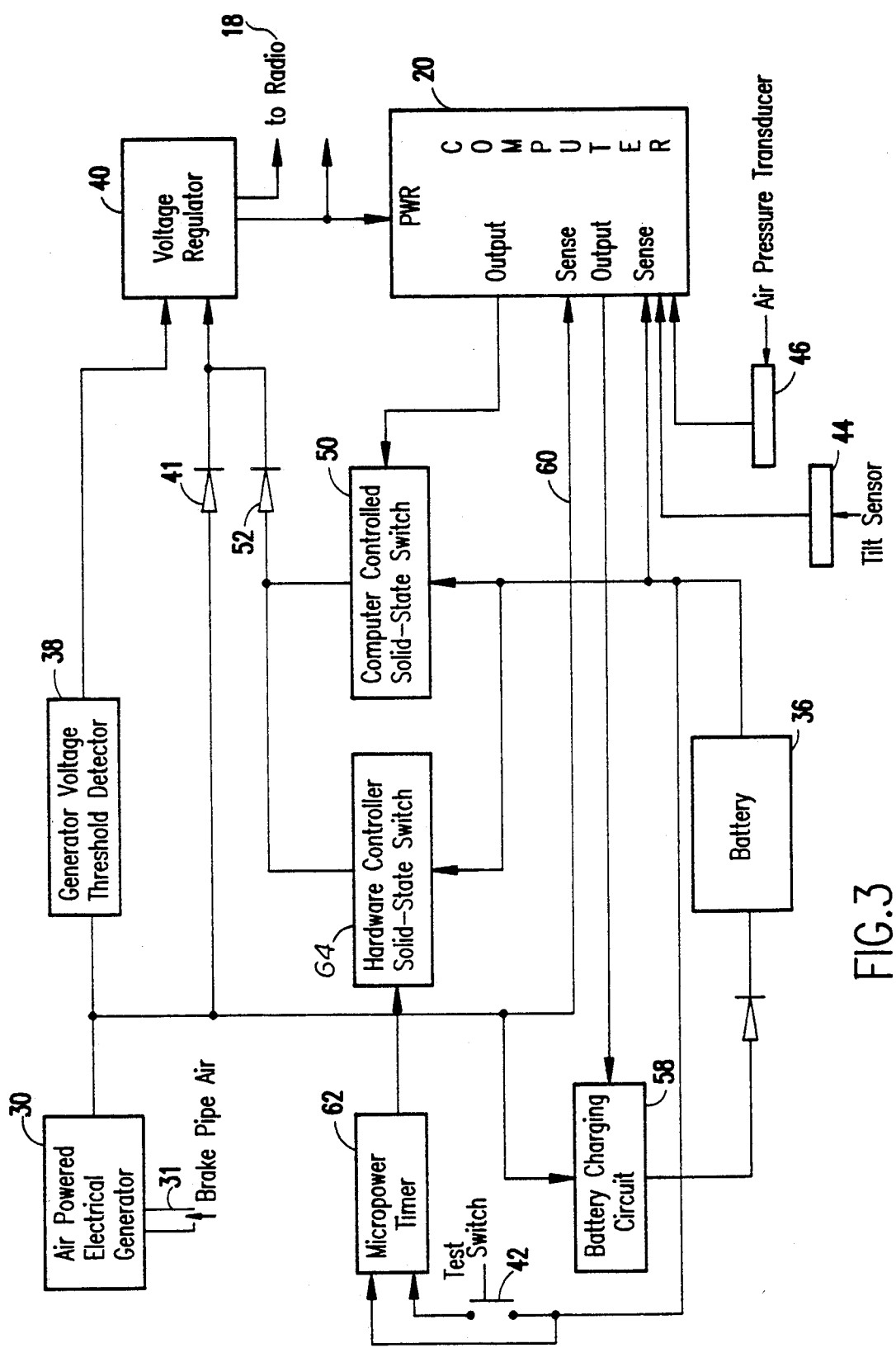
FIG. 3 is a block diagram illustrating an embodiment of the invention with a back-up battery.

Referring now to FIG. 3, in this embodiment of the invention, a back-up electric storage battery 36 has been added to the system to provide operating power to the EOT unit in the event of a failure of the primary air driven generator 30 or in the event of momentary loss of brake pipe air. A generator voltage thresh-hold detector 38 provides an orderly start-up. It monitors the generator voltage and turns on a voltage regulator 40 whose output powers the EOT components, only when the generator voltage is high enough to support the operation of the components of the EOT. A diode 41 couples the air-driven generator 30 to the regulator 40. Thus, the EOT turns itself "on" when there is sufficient voltage generated by the air-driven generator 30. The EOT can be tested by closing a test switch 42, which, as will be explained in more detail, powers the system for a short interval from the back-up battery 36 in order to allow testing of the system prior to installation on the end of a train. Other than in a test condition, connection of the back-up battery 36 to the system is controlled by computer 20.

To control connection of the back-up battery 36, the computer 20 has inputs from a tilt sensor 44 and a transducer 46 that provides an indication of air brake pressure to the computer 20. As will be appreciated by those skilled in the art, EOT units are commonly equipped with such a tilt detector. It indicates when the EOT unit is in a tilted position and not operationally installed at an end-of-train coupler (when so installed it is in an upright, vertical position). A computer controlled switch 50, such as a pulse operated set/reset solid-state relay, and a diode 52 couple the back-up battery 36 to the voltage regulator 40. Computer 20 is programmed to turn switch 50 "on", coupling the back-up battery to the diode 52 when two conditions are met: the equipment has been in an upright position (as indicated by the tilt detector 44 input to the computer) for a predetermined interval and the brake air pressure exceeds a certain pressure for a predetermined interval. Typical values are 120 seconds in an upright position, and brake air pressure greater than 45 psi for 5 minutes. Here it should be noted, that under normal operation, the output voltage of the air-driven generator 30 exceeds the back-up battery voltage so that the diode 52 is back biased and the battery is therefore not coupled to the voltage regulator 40 unless the generator voltage falls below the battery voltage. With switch 50 in its "on" state, back-up battery 36 will be automatically connected to the EOT components if the output voltage of the generator 30 falls below the back up battery voltage so that the back-up will provide power in the event of a loss of output from the air-powered generator. Advantageously, the computer may be programmed to turn off the solid state switch 50 if the battery voltage falls below a predetermined level in order to prevent damage to the battery. In any event, the computer is programmed to set switch 50 to its "off" condition, disconnecting the battery 36 from diode 52 if the tilt detector 44 indicates the unit is in a tilted position for a predetermined interval and the air brake pipe air pressure is below a certain thresh-hold, a condition that indicates the EOT unit has been removed from the end of the train.

The computer 20 controls a back-up battery charging circuit 58 that couples the air-powered electrical generator 30 to the back-up battery 36 when turned on by the computer 20. Under normal operating conditions with full output voltage from generator 30 (as determined by the voltage sense input 60 to the computer), the generator is coupled to the battery to maintain its charge. The computer may be programmed to turn off the charging circuit in conditions of low or marginal generator voltage so that all of the available generator power is used to power the components of the EOT.

The test switch 42 allows the equipment to be energized for testing purposes even when the unit is in a tilted position and there is no pressure in the air brake pipe. Test switch 42 connects the back-up battery 36 to a micro-power timer 62 which closes a solid-state switch 64 for a predetermined interval so the battery 36 is coupled to the voltage regulator 40 for this interval providing power to the EOT components and thus allowing an operator to check their operation. Typically, the interval will be on the order of one minute.

Both the micropower timer 62 and the solid-state switches 64,50 are designed to consume a very small amount of power, especially in the "off" state, so as not to discharge the battery when the equipment is in the out-of-operation state.

Figure 4:
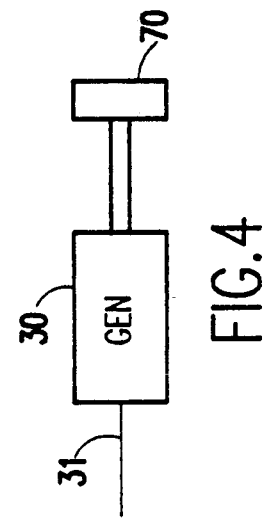
FIG. 4 is a schematic illustration of a fly wheel power back-up that can provide drive to the generator for short durations in the event of a failure of air drive.

FIG. 4 illustrates an embodiment of the invention in which a fly wheel 70 coupled to the shaft of a generator 30 stores energy during operation of the generator. In the event of a cessation of air flow to the generator 30, the stored energy in the fly wheel will drive the generator shaft so that the generator will continue to produce sufficient electrical output to power the EOT operating components for an interval depending on the energy stored in the fly wheel; for example, five minutes, or enough time for the EOT to be able to send a message to the HOT advising that it is going off the air due to power failure.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An end-of-train unit for a railroad train, said railroad train having an air brake pipe, said end-of-train unit comprising in combination:
    electrically operated end-of-train components;
    an air-driven electric power generator having an air input and an electric power output;
    means to couple said air input of said air-driven electric power generator to said air brake pipe;
    means to couple said electric power output of said air-driven electric power generator to said electrically operated end-of-train components to supply all power coupled to said electrically operated end-of-train components;
    a back-up electric storage battery; and
    means to couple said back-up electric storage battery to said electrically operated end-of-train components in the event that the power output of said air-driven electric powered generator falls below a predetermined level.

2. An end-of-train unit for a railroad train as in claim 1, wherein said means to couple said back-up electric storage battery includes means to prevent coupling of said back-up electric storage battery to said electrically operated end-of-train components when said end-of-train unit is not installed at the end of a train.

3. An end-of-train unit for a railroad train as in claim 2, further including means for coupling said back-up electric storage battery to said electrically operated end-of-train components for a short duration to test said end-of-train components when said end-of-train unit is not installed at the end of a train.

* * * * *